(12) United States Patent
Lokhandwala et al.

(10) Patent No.: US 6,923,112 B2
(45) Date of Patent: Aug. 2, 2005

(54) JUICE EXTRACTOR INCLUDING CUTTER COMPONENTS FOR ENHANCED QUALITY AND YIELD PERFORMANCE AND ASSOCIATED METHODS

(75) Inventors: Juzar A. Lokhandwala, Temple Ter., FL (US); Guiwen Cheng, Lakeland, FL (US)

(73) Assignee: FMC Technologies, Inc.

( * ) Notice: Subject to any disclaimer, the term of this patent is extended or adjusted under 35 U.S.C. 154(b) by 17 days.

(21) Appl. No.: 10/272,533

(22) Filed: Oct. 15, 2002

(65) Prior Publication Data

US 2004/0069159 A1 Apr. 15, 2004

(51) Int. Cl.$^7$ .............................. B30B 9/02; A23N 1/02
(52) U.S. Cl. ...................... 99/509; 99/510; 100/98 R; 100/108; 100/213; 76/108.1
(58) Field of Search .................... 99/501, 506, 495, 99/502, 504, 509, 510; 100/213, 98 R, 94, 108; 30/495, 130, 174, 301, 346.55, 352, 357; 76/21, 108.1, 115, 102

(56) References Cited

U.S. PATENT DOCUMENTS

| | | | |
|---|---|---|---|
| 2,649,730 A | | 8/1953 | Hait |
| 2,780,988 A | | 2/1957 | Belk et al. |
| 3,236,175 A | * | 2/1966 | Belk ........................... 100/108 |
| 3,717,084 A | | 2/1973 | Robbins et al. ................. 146/3 |
| 3,736,865 A | | 6/1973 | Hait ............................. 100/98 |
| 4,154,163 A | | 5/1979 | Niemann ..................... 100/98 |
| 4,376,409 A | | 3/1983 | Belk ........................... 99/509 |
| 4,700,620 A | | 10/1987 | Cross ........................... 99/510 |
| 4,871,569 A | | 10/1989 | Anderson et al. ........... 426/489 |
| 4,922,813 A | | 5/1990 | Compri ....................... 99/510 |
| 5,070,778 A | * | 12/1991 | Cross et al. .................... 99/510 |
| 5,170,700 A | | 12/1992 | Anderson et al. ............. 99/510 |
| 5,655,441 A | | 8/1997 | Mendes ........................ 99/510 |
| 5,970,861 A | | 10/1999 | Suter et al. .................... 100/37 |
| 5,992,311 A | | 11/1999 | Suter et al. .................... 100/37 |
| 6,293,189 B1 | | 9/2001 | Evans et al. .................. 99/510 |
| 6,568,319 B2 | * | 5/2003 | Schrader et al. ............ 100/108 |

FOREIGN PATENT DOCUMENTS

GB 2116021 * 9/1983

OTHER PUBLICATIONS

The FMC Whole Citrus Juice Extractor designated An International Historic Mechanical Engineering Landmark by the American Society of Mechanical Engineers; Mar. 24, 1983.

* cited by examiner

Primary Examiner—Reginald L. Alexander
(74) Attorney, Agent, or Firm—Allen, Dyer, Doppelt, Milbrath & Gilchrist, P.A.

(57) ABSTRACT

A juice extractor includes first and second cups being relatively movable along a reciprocal path of travel to compress fruit therebetween during juice extraction. The extractor also includes a first cylindrical cutting blade within a first cup bore in spaced relation from adjacent portions of a first plurality of fingers of the first cup to define a peel clearance for ejecting portions of a fruit peel therethrough. The extractor also includes a second cylindrical cutting blade within a second cup bore, and being received within the first cylindrical cutting blade during juice extraction. The first cylindrical cutting blade preferably has an inner diameter in a range of about 0.990 to 1.010 inches, and a wall thickness in a range of about 0.068 to 0.088 inches. The second cylindrical cutting blade preferably has an outer diameter to be received within the inner diameter of the first cylindrical cutting blade to thereby produce a desired relatively high yield and juice quality.

31 Claims, 9 Drawing Sheets

JUICE EXTRACTOR INCLUDING CUTTER COMPONENTS FOR ENHANCED QUALITY AND YIELD PERFORMANCE AND ASSOCIATED METHODS

FIELD OF THE INVENTION

This invention relates to the field of food processing, and, more particularly to juice extractors.

BACKGROUND OF THE INVENTION

Citrus juice extraction on a commercial scale can be advantageously performed with a juice extractor including upper and lower cups that move relative to one another along a reciprocal path of travel. The sides of both the upper and lower cups typically comprise fingers that support a fruit so that it can be squeezed without bursting. The fingers of the upper cup interdigitate or intermesh with those of the lower cup.

An orange or other fruit can be fed, for example, to the bottom cup by a cam-operated feeding device. The upper and lower cups are then brought together so that the respective fingers of the cup intermesh and the fruit therebetween is accordingly squeezed.

Sharp, typically circular, cutters are positioned in the top and bottom cups. As the cups move relative to one another, the fruit is pressed against the cutters. The cutters cut plugs from both the top and bottom portions of the fruit as the interdigitating fingers of the two cups mesh together.

The cutting of the plug from the top portion of the fruit promotes separation of the peel from the internal portions of the fruit (i.e., juice and pulp). The plug cut from the lower portion of the fruit allows the internal portions of the fruit to be forced down into a strainer tube positioned just below the lower cup cutter. The strainer tube, in turn, is positioned within a manifold.

After the internal portions of the fruit have been squeezed into the strainer tube, an orifice tube moves upward into the strainer tube applying pressure to the internal portion of the fruit therein. This causes the juice and juice sacs, due to their small particle size, to flow through small holes of the strainer tube and into the juice manifold, thus separating out the juice and pulp. Core material that typically includes membrane, seeds, and peel plugs is discharged out of the bottom of the orifice tube. Such extractors are disclosed, for example, in U.S. Pat. Nos. 5,970,861 and 5,992,311 to Suter et al.

Owing to economic efficiency considerations, the juice extractor should accomplish juice extraction rapidly with a high yield rate (i.e., the quantity of juice recovered relative to the amount of fruit processed). Quality considerations, though, dictate that care should be taken regarding the peel oil extracted from the peel during cutting and squeezing. Such oil, if mixed into the juice in higher quantities, reduces the quality of the juice.

U.S. Pat. No. 5,070,778 to Cross et al. discloses a cutting head comprising a core and a cylindrical blade portion surrounding the core in a spaced relation thereto. Side openings or windows are formed in the side surface of the cylindrical blade portion, and the core has a conical shape adjacent the windows. Accordingly, pressure from the orifice tube pushes some peel oil out the sides of the cutting head through the windows. Rings of fruit peel resulting from cutting plugs in the fruit nonetheless may be mixed in with the internal portions of the fruit. If so, the result is an increase in peel oil in the juice ultimately produced, and, accordingly, a reduction in the quality of the juice.

Successful juice extraction involves a trade-off between high yield rates and high juice quality. With respect to the latter, for example, the amount of peel oil that is introduced into the juice during extraction should be limited.

Another approach to enhancing yield and quality performance was attempted by FMC and included different sized components for the extractor. In particular, typical FMC juice extractors are available in so-called "one inch" and "three-quarter inch" versions. The measurement is the nominal dimension for the inner diameter of the lower cylindrical cutter. The upper cutter is sized slightly larger than the lower cutter. The peel clearance, that is, the space between the outer diameter of the upper cutter and adjacent upper cup portions, is typically the same for either one inch or three-quarter inch components, and is based upon the fruit. In an attempt to produce higher quality juice while still providing high yield, a seven-eighths inch lower cutter was made and used along with a standard sized upper cup for one inch extractor components. Accordingly, to provide the proper peel clearance, the wall thickness of the upper cutter was enlarged to about 0.094 inches. The thick-walled upper cutter also required a larger bore on the lower cup to provide adequate clearance. Unfortunately, even this attempted arrangement of components was not fully satisfactory in meeting juice quality and yield goals.

SUMMARY OF THE INVENTION

In view of the foregoing background, it is therefore an object of the present invention to provide a juice extractor and associated methods producing high quality juice and with a relatively high yield.

This and other objects, features, and advantages in accordance with the present invention are provided by a juice extractor including first and second cups being relatively movable along a reciprocal path of travel to compress fruit therebetween during juice extraction; a first cylindrical cutting blade within a first cup bore and in spaced relation from adjacent portions of a first plurality of fingers to define a peel clearance for ejecting portions of a fruit peel therethrough; and a second cylindrical cutting blade within a second cup bore and being received within the first cylindrical cutting blade during juice extraction. Moreover, the first cylindrical cutting blade preferably has an inner diameter in a range of about 0.990 to 1.010 inches, and a wall thickness in a range of about 0.068 to 0.088 inches. The second cylindrical cutting blade preferably has an outer diameter to be received within the inner diameter of the first cylindrical cutting blade. These particular component sizes have been found to produce a desired relatively high yield and juice quality.

The inner diameter of the first cylindrical cutting blade may more preferably be in a range of about 0.997 to 1.003 inches. In addition, the wall thickness of the first cylindrical cutting blade may more preferably be in a range of about 0.075 to 0.081 inches.

The second cylindrical cutting blade may have an inner diameter in a range of about 0.845 to 0.905 inches, and, more preferably, in a range of about 0.878 to 0.884 inches. The peel clearance may be in a range of about 0.078 to 0.110 inches for most oranges, for example. The second cylindrical cutting blade may also have an outer diameter less than about 0.970 inches.

The first cutter may also include a core positioned within the first cylindrical cutting blade. The first cylindrical cutting blade, as well as the second cylindrical cutting blade may have a beveled cutting edge.

Another aspect relating to juice yield and quality relates to the second cutter and its mounting in the second cup. More particularly, the second cup may further include a ring base connected to the second plurality of fingers. The second cutter may include a flange mounting the second cylindrical cutting blade to the ring base at a level flush with or above adjacent portions of the ring base. Accordingly, portions of the peel and other debris may more readily clear from this area.

Yet another aspect relating to juice yield and quality relates to a construction of some first cutter embodiments. In these embodiments, the first cutter includes a first cutter base connected to the first cylindrical cutting blade. Moreover, the first cutter base may have at least one base opening therein to also more readily clear peel portions and other debris.

Other aspects of the invention relate to the cutter for use with the juice extractor and methods for making the cutter. The cutter may comprise a base, and a cylindrical cutting blade extending outwardly from the base and having an inner diameter in a range of about 0.990 to 1.010 inches, and a wall thickness in a range of about 0.068 to 0.088 inches.

DETAILED DESCRIPTION OF PREFERRED EMBODIMENTS

Figure 1:
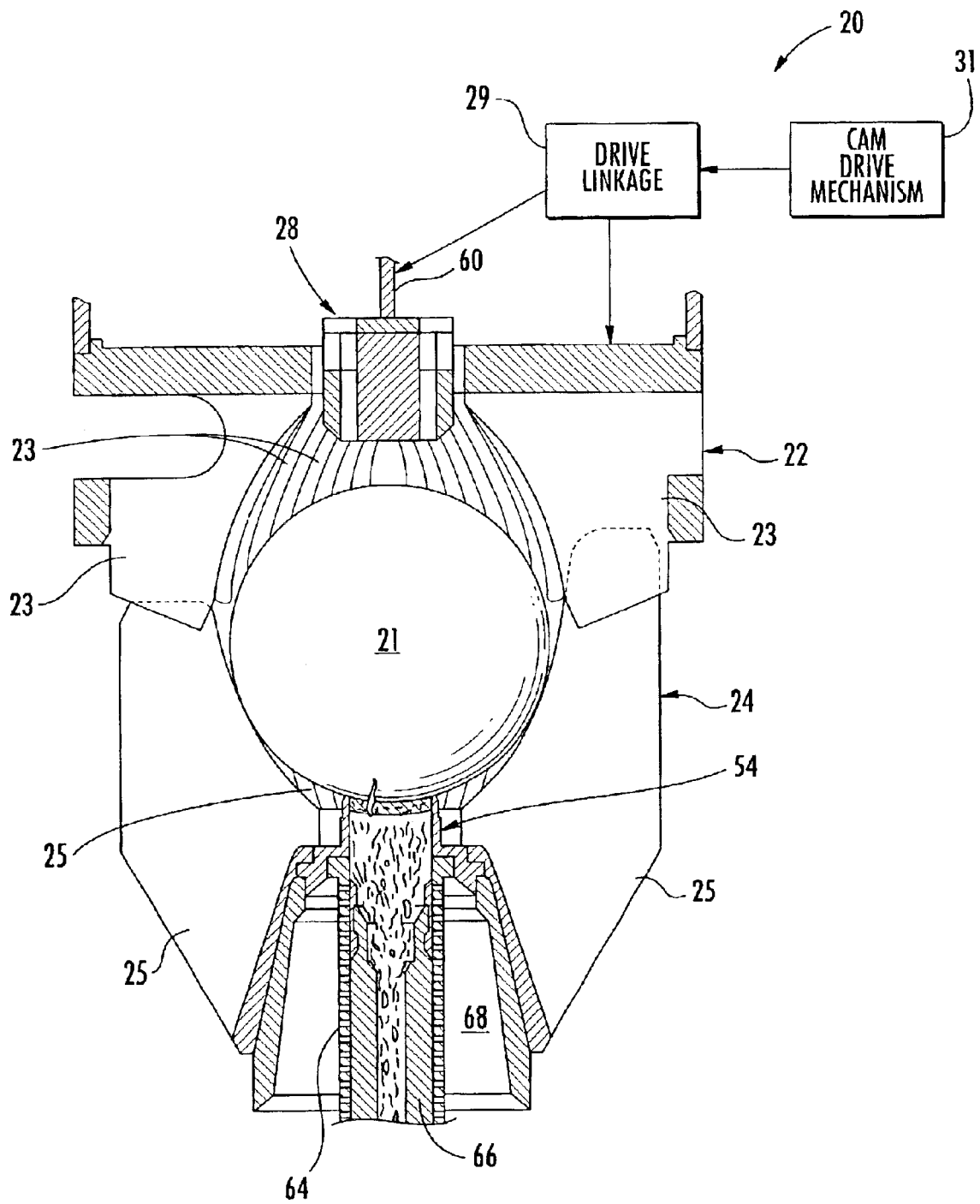
FIG. 1 is a cross-sectional and partial schematic view of portions of a juice extractor prior to compressing the fruit according to the present invention.
Figure 2:
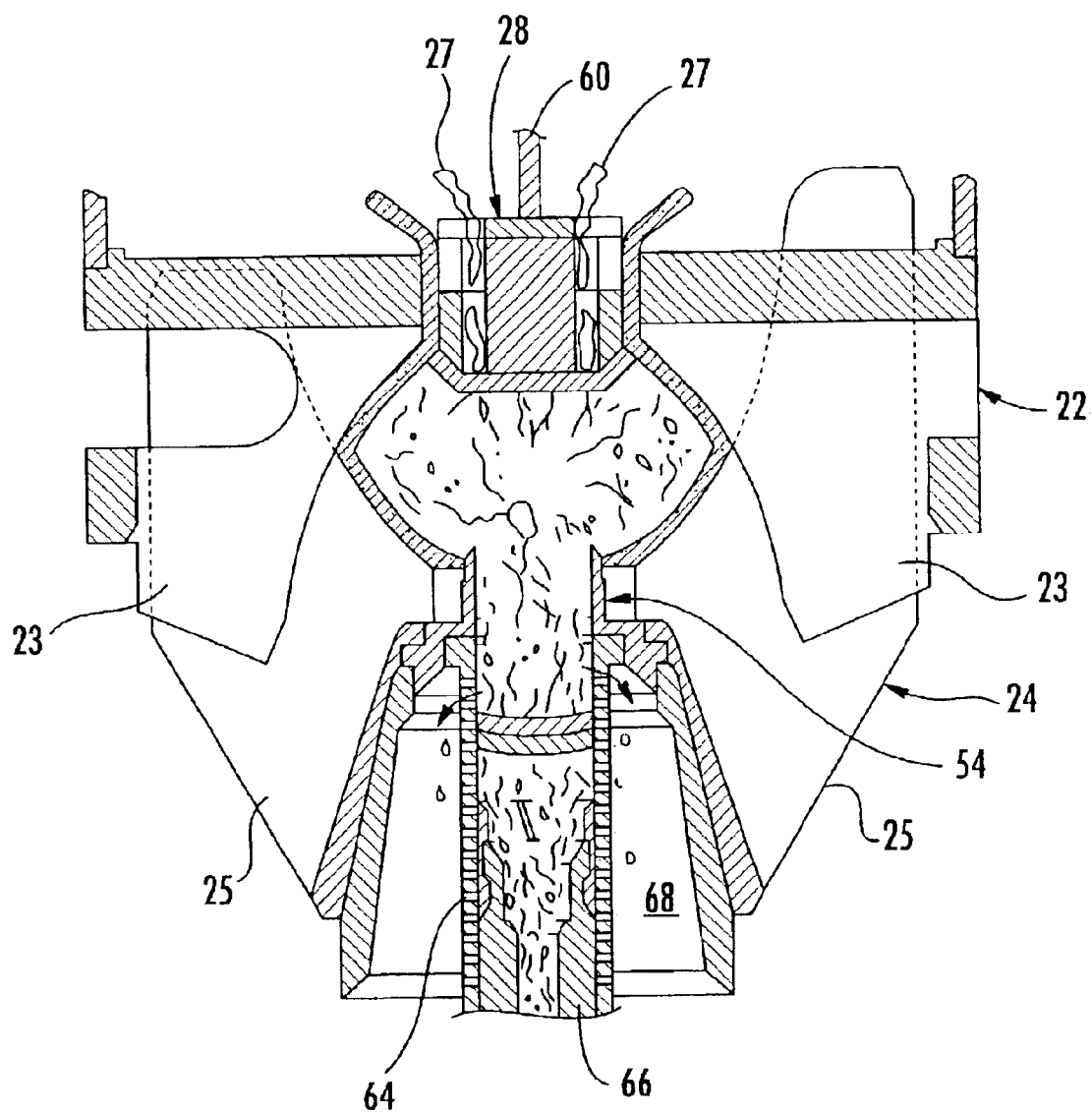
FIG. 2 is a cross-sectional view of a portion of the juice extractor of FIG. 1 during compression of the fruit.
Figure 3:
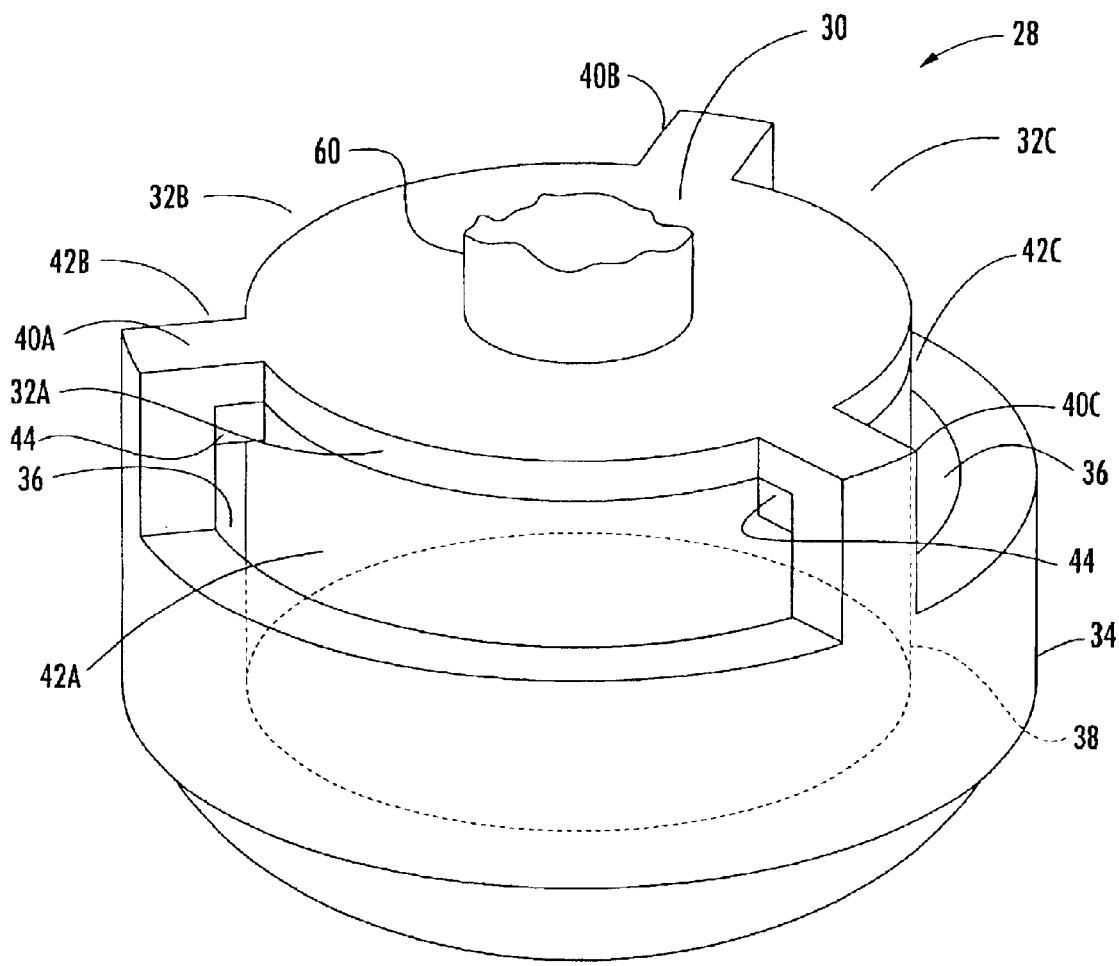
FIG. 3 is an enlarged perspective view of the first cutter of the juice extractor of FIG. 1.
Figure 4:
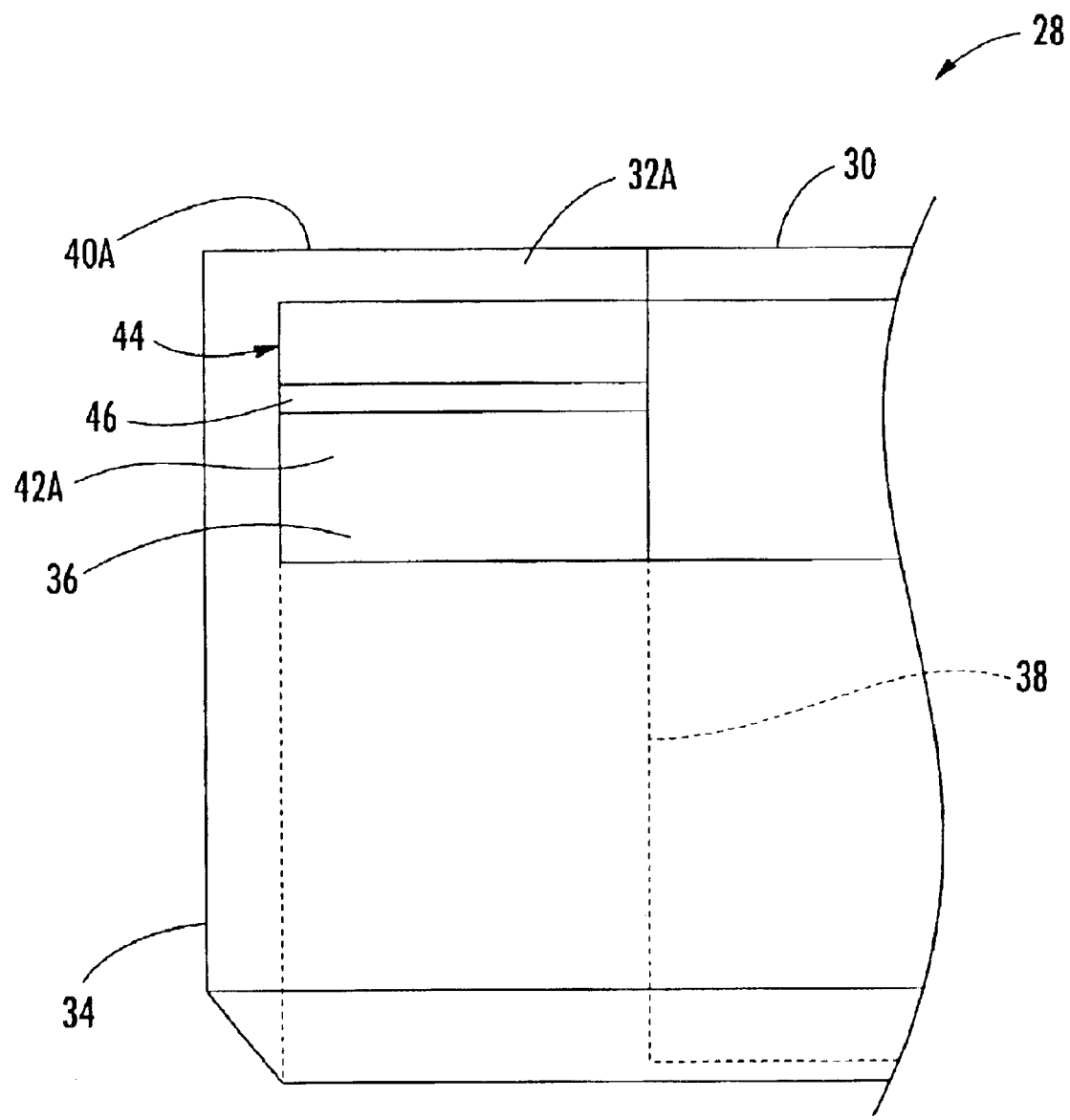
FIG. 4 is an enlarged partial side elevation view of the first cutter of FIG. 2.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Referring initially to FIGS. 1–4, a juice extractor 20 according to the present invention is described. The juice extractor 20 illustratively includes first and second cups 22, 24 between which a fruit 21 (e.g., orange, grapefruit, etc.) may be held. With the fruit therebetween, the first and second cups 22, 24 come together by moving relative to one another illustratively along a substantially linear reciprocal path of travel, for example. The fruit peel is separated and the internal portions of the fruit are extracted as the first and second cups 22, 24 come together thereby compressing the fruit 21 as will be readily understood by those skilled in the art.

The fruit is held in the second cup 24 with the first cup 22 illustratively descending downwardly from above the second cup 24 and onto the fruit 21. Illustratively, a cam drive mechanism 31 connected to the first cup 22 by a drive linkage 29 drives the first cup linearly downward. As will be readily appreciated by those skilled in the art, other orientations of the first and second cups 22, 24, as well as other mechanisms for moving them relative to one another may alternately be used. For example, the first and second cups 22, 24 may be oriented in the same horizontal plane, and each may move toward the other in a horizontal direction driven by one of various drive mechanisms known to those skilled in the art.

As further illustrated, the first cup 22 comprises a first plurality of fingers 23, and the second cup 24 comprises a second plurality of fingers 25. Both pluralities of fingers 23, 25 extend outwardly to intermesh and compress the fruit 21 as the respective cups 22, 24 move together.

Illustratively, the first plurality of fingers 23 extends radially outwardly to define a first cup bore 26. A first cutter 28 is received within the first cup bore 26 such that it is positioned within a top portion of the first cup 22. The first cutter 28 cuts a plug in a top portion of the fruit 21 to permit a separation of the fruit peel from interior portions of the fruit. As will be readily understood by those skilled in the art, this helps prevent the fruit 21 from bursting as it is squeezed between the respective pluralities of fingers 23, 25 of the first and second cups 22, 24.

The first cutter 28 illustratively comprises a first cutter base 30 having three base openings 32A, 32B, 32C. As will be readily appreciated by those skilled in the art, the first cutter 28 may alternately have more than three base openings or it may have as few as one. The first cutter 28 further has a first cutting blade 34 extending outwardly from the first cutter base 30. Illustratively, the first cutting blade 34 has a cylindrical shape and a beveled cutting edge. The first cutting blade 34, in extending outwardly from the first cutter base 30, defines an interior passageway 36. The interior passageway 36, as shown, is in communication with the base openings 32A, 32B, 32C and thus permits the release of debris therethrough.

The interior passageway 36, through which debris such as fruit peel is released, lends the first cutter 28 distinct advantages over conventional cutters having no or only side openings. In contrast to conventional cutters, when the first cutter 28 of the present invention cuts into the fruit 21, the fruit peel and other debris is much less likely to become trapped or wedged therein. Instead, under the pressure that results as the first and second cups 22, 24 come together squeezing the fruit 21 therebetween, the debris is pushed along and out the interior passageway 36. Specifically, if the first cup 22 is oriented above the second cup 24 and descends onto the fruit 21, the resulting pressure forces the debris upwardly and out from the first cutter 28 (as indicated by the arrows 27 in FIG. 2).

Illustratively, each of the base openings 32A, 32B, 32C of the first cutter 28 opens outwardly to a periphery defined by adjacent base portions 40A, 40B, 40C. This accordingly enhances the release of debris through the interior passageway 36. Additionally, the first cutting blade 34 has three blade openings 42A, 42B, 42C therein. Moreover, each blade opening 42A, 42B, 42C is illustratively in communication with a respective one of the three base openings 32A, 32B, 32C thus further enhancing the release of debris through the interior passageway 36.

Optionally, the first cutter 28 may include a core 38 that extends outwardly from the first cutter base 30 so that the core is positioned within the first cutting blade 34. As shown, the optionally included core 38 within the first cutting blade 32 is in a spaced relation from the first cutting blade.

Additionally, the first cutter 28 may optionally include debris deflectors 44 adjacent the first cutter base 30. As illustrated, each debris deflector 44 has a pointed edge 46 directed toward the interior passageway 36. A blade opening 42A in communication with a base opening 32A defines an L-shaped support leg that connects together the first cutter base 30 and the first cutting blade 34. The debris deflector 44 is illustratively adjacent an inner portion of an L-shaped support leg as shown.

Figure 5:
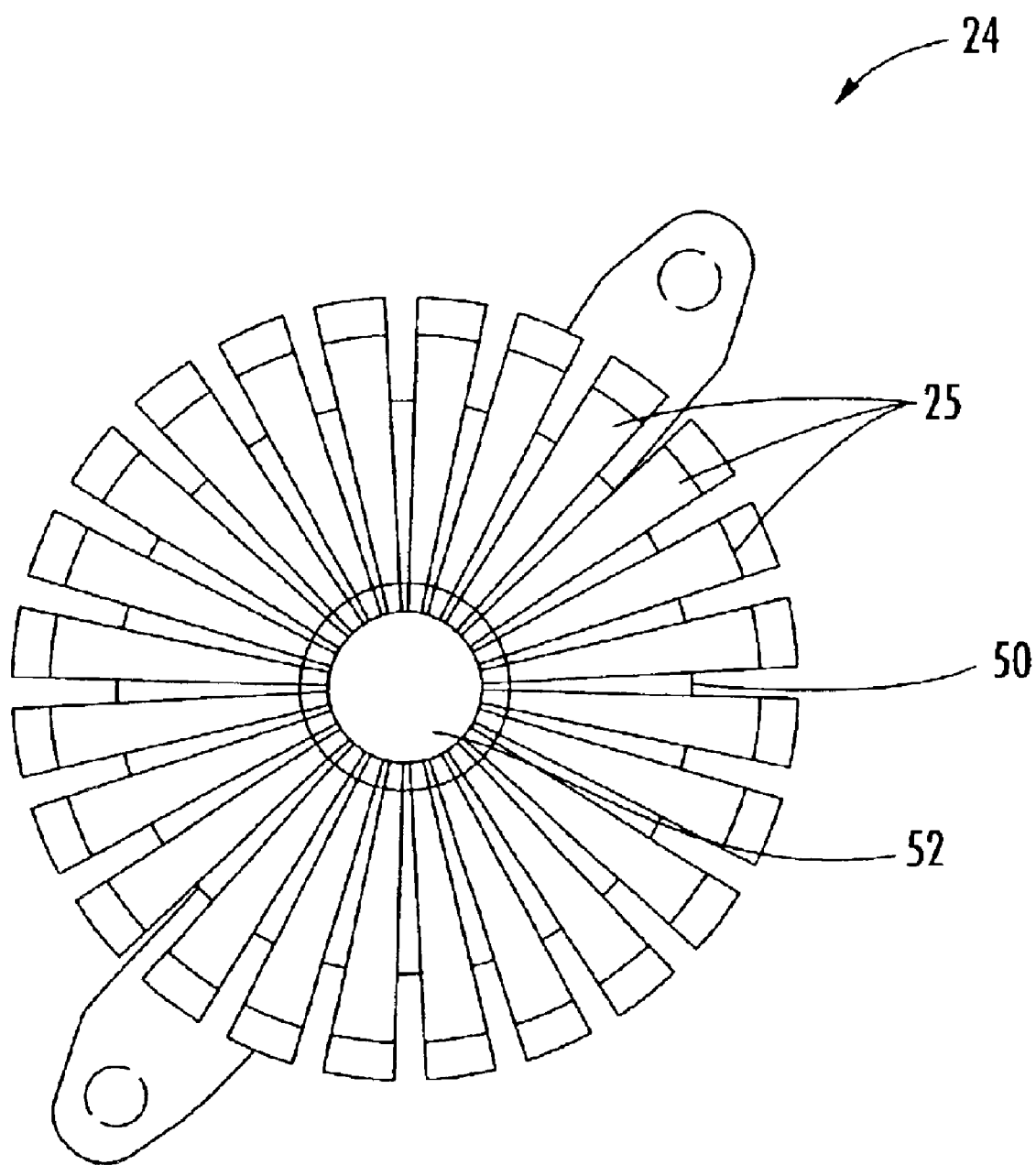
FIG. 5 is a top plan view of the second cup of the juice extractor illustrated in FIG. 1.
Figure 6:
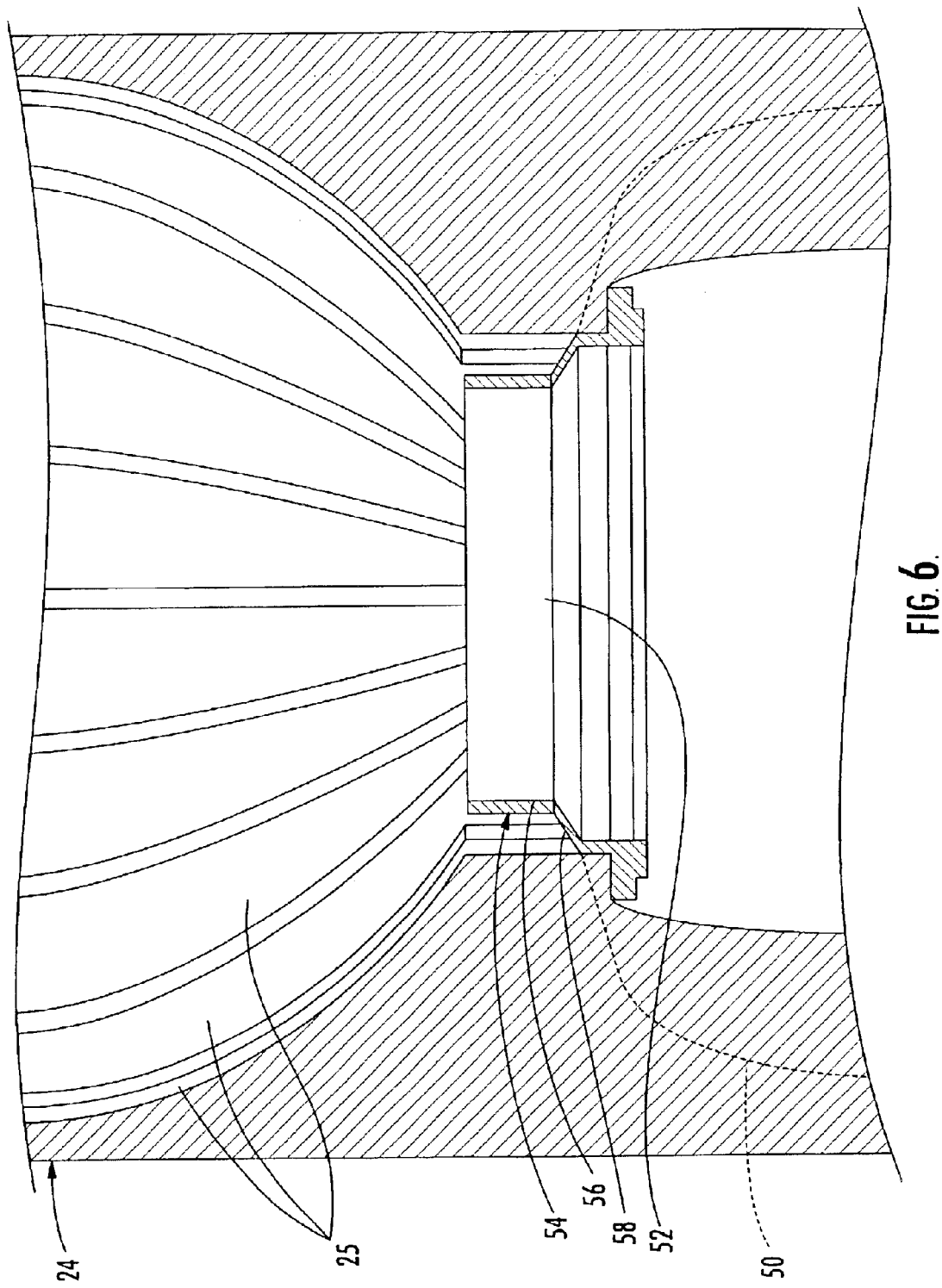
FIG. 6 is a cross-sectional view of the second cup and second cutter associated therewith of the juice extractor illustrated in FIG. 1
Figure 7:
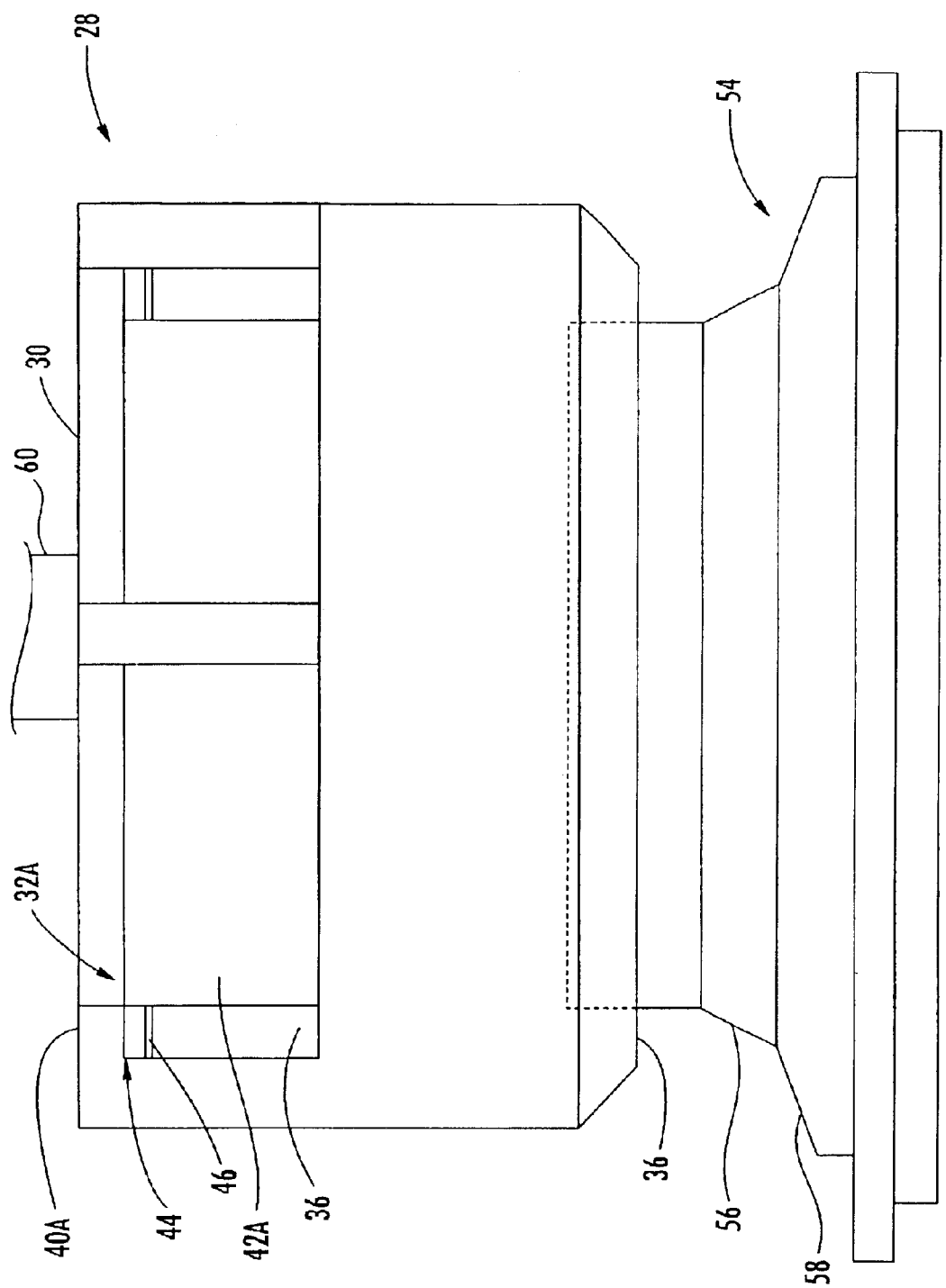
FIG. 7 is an enlarged side elevation view of first and second cutters of the juice extractor illustrated in FIG. 1.

Referring additionally now to FIGS. 5–7, another aspect of the juice extractor 20 relative to quality and yield is now described. The second cup 24 illustratively comprises a ring base 50 defining a second cup bore 52. The second plurality of fingers 25 extends outwardly from the ring base 50. Illustratively, the second cup 24 further mounts a second cutter 54 within the second cup bore 52. The second cutter 54 illustratively includes a second cutting blade 56. As perhaps best shown in FIG. 7, the second cutting blade 56 is sized so that it can be received within the interior passageway 36 of the first cutter 28.

As also illustrated, a flange 58 extends outwardly from the second cutting blade 56 to mount the second cutter 54 in the second cup bore 52. The flange 58 is illustratively at a level flush with adjacent portions of the ring base 50. As will be readily understood by those skilled in the art the flange 58 may also be at a level above the ring base 50. The flange 58 serves to prevent cut and separated fruit peel, including the peel ring resulting from the cutting of plugs in the fruit 21, from becoming mixed in with the internal portions squeezed from the fruit by the first and second cups 22, 24. Accordingly, without reducing juice yield, the flange 58 enhances juice quality by lessening the amount of peel oil that would otherwise be added to the juice during squeezing.

The optionally included debris deflectors 44, illustratively having pointed edges 46, may cooperate with the flange 58 by further segmenting the fruit peel and deflecting it away from the first and second cutters 22, 24 and, hence, away from the internal portions of the fruit 21. Again, the deflection of the peel ring away from the internal portions squeezed from the fruit 21 reduces the amount of peel oil in the juice ultimately produced, thereby enhancing juice quality without reducing juice yield.

A shaft 60 illustratively extends outwardly from the first cutter base 30 opposite the first cutting blade 34. The shaft 60 may secure the first cutter 28 to the drive linkage 29 connected to the cam drive mechanism 31 that illustratively drives the first cup 22 down onto the fruit 21 during juice extraction.

Referring again to FIGS. 1 and 2 in particular, the fruit 21 is squeezed as the cam drive mechanism 31 drives the first cup 22 together with the second cup 24. The first cutter 28 cuts a top plug in the fruit as the first cup 22 moves against the fruit 21. The fruit 21 is also forced against the second cutting blade 56, which cuts a bottom plug into a bottom portion of the fruit 21. As a result of increasing pressure during the extraction process, the internal portions 62 of the fruit 21 are forced through the bottom portion plug and into a prefinisher tube 64. Separated fruit peel is discharged between the first cup 22 and the first cutter 28. As detailed above, any fruit peel or debris within the first cutter 28 is released through the interior passageway 36.

As the internal portions 62 of the fruit 21 are extracted, they move into a prefinisher tube 64. When extraction is complete, an orifice tube 66 moves upward from below the prefinisher tube 64 creating pressure on the contents therein, which causes extracted juice to flow out through holes in the prefinisher tube and into a juice manifold 68. The release of fruit peel and other debris through the internal passageway 36 and its deflection by the flange 58 prevents the debris from mixing with the internal portions of the fruit 21. Accordingly, the quality of the extracted juice is higher.

Figure 8:
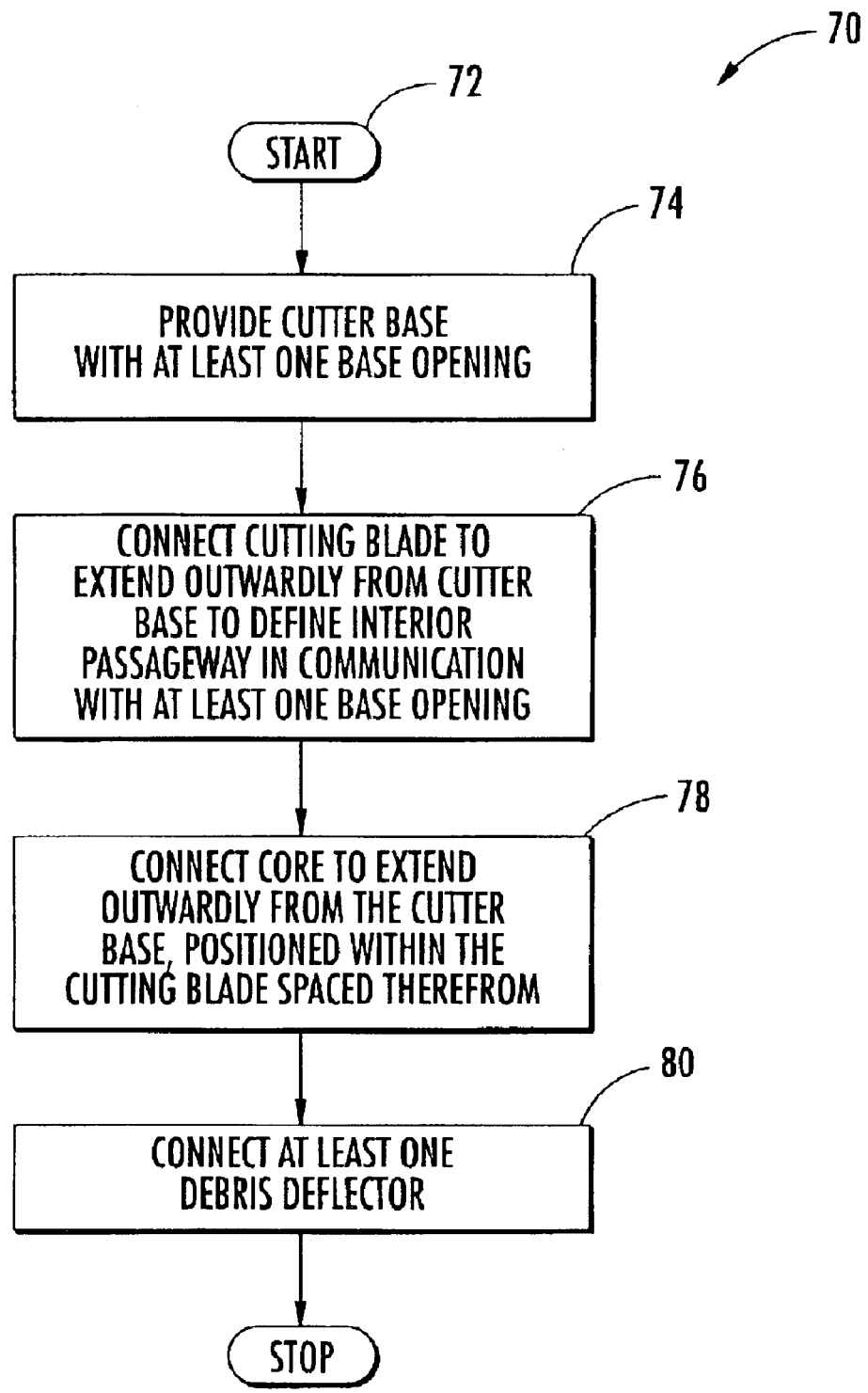
FIG. 8 is a flow diagram of a method of making a cutter for a juice extractor according to the present invention.

An additional aspect of the present invention relates to a method of making a cutter 28 for use with a juice extractor 20 that includes first and second cups 22, 24 that move relatively with one another to compress fruit therebetween during juice extraction. The method illustrated by flow chart 70 of FIG. 8 includes, after starting (Block 72), providing a cutter base 30 that has at least one base opening 32A, 32B, 32C therein (Block 74). Providing a cutter base 30 having at least one base opening 32A, 32B, 32C may entail providing at least one base opening that opens outwardly to a periphery defined by adjacent base portions 40A, 40B, 40C.

The method further illustratively includes, at Block 76, connecting a cutting blade 34 to extend outwardly from the cutter base 28 to thereby define an interior passageway 36 in communication with the at least one base opening 32A, 32B, 32C so that debris may be released therethrough. The method optionally may further entail providing the cutting blade 34 with at least one blade opening 42A, 42B, 42C therein so that the at least one blade opening is in communication with at least one base opening 32A, 32B, 32C.

Illustratively, the method further includes at Block 78, optionally connecting a core 38 to extend outwardly from the cutter base 28 so that it is positioned within the cutting blade in spaced relation therefrom. The method also illustratively includes, at Block 80, optionally connecting at least one debris deflector 44 to the cutter base 30. The connecting of at least one debris deflector 44 may optionally entail connecting at least one debris deflector that has a pointed edge 46 directed along the interior passageway 36.

Figure 9:
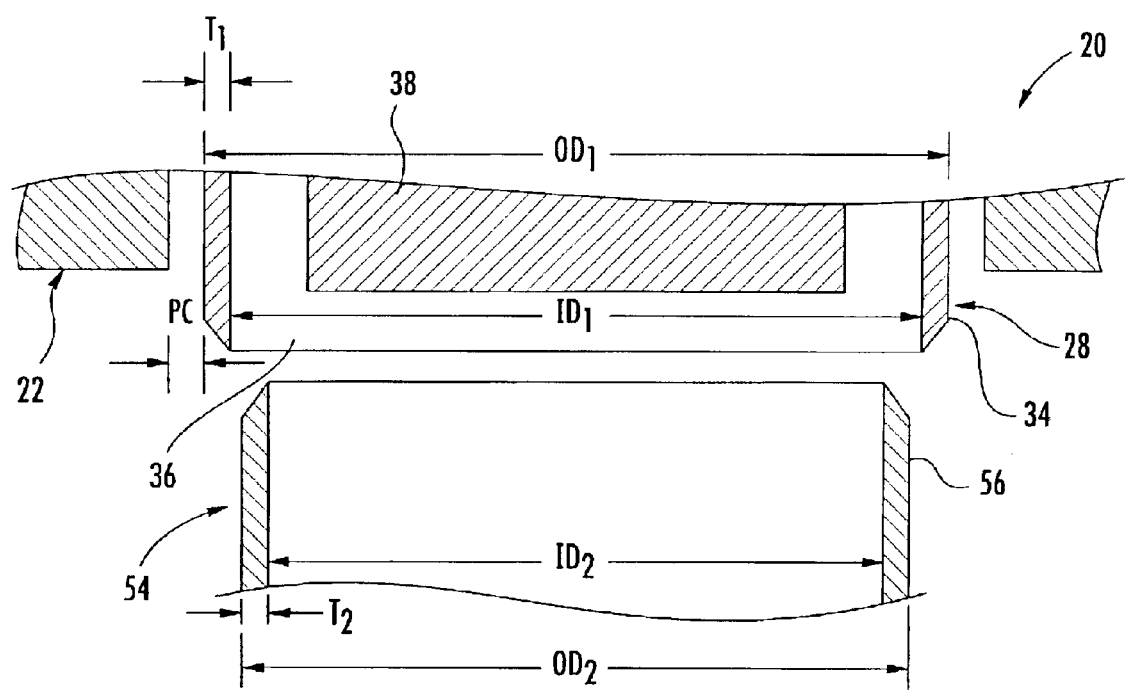
FIG. 9 is a cross-sectional view of the first and second cutting blades as shown in FIG. 7 with various dimensions marked for clarity of explanation.

Turning now additionally to FIG. 9 other features of the extractor 20 relating to enhancing juice quality and yield are now described. These features may be used independently or together with those features already discussed above as will be appreciated by those skilled in the art. More particularly, the first cylindrical cutting blade 34 may preferably have an inner diameter $ID_1$ in a range of about 0.990 to 1.010 inches, and a wall thickness $T_1$ in a range of about 0.068 to 0.088 inches. The second cylindrical cutting blade 56 may preferably have an outer diameter $OD_2$ to be received within the inner diameter $ID_1$ of the first cylindrical cutting blade 34. These particular component sizes have been found to produce a desired relatively high yield and juice quality.

Prior art attempts at trying various sizes of the cutters, etc. has not produced the desired high juice yield and high juice quality unexpectedly produced by these particular component dimensions. Indeed, it is theorized, without Applicants wishing to be bound thereto, that at least some of the unexpected improvement comes from more efficiently clearing the peel from the inner fruit as a result of the thinner walled cylindrical cutting blade 34 of the first cutter 28 in accordance with this aspect of the invention, and as compared to the thicker walled blade as used in the prior art. It is also theorized, without Applicants wishing to be bound thereto, that the inner diameter of the first cutting blade 34 also cooperates with the seven-eighths inch second cutter 54 to provide high yield and without excessive peel oil entering the juice during extraction.

The inner diameter $ID_1$ of the first cylindrical cutting blade 34 may more preferably be in a range of about 0.997 to 1.003 inches. In addition, the wall thickness $T_1$ of the first cylindrical cutting blade 34 may more preferably be in a range of about 0.075 to 0.081 inches. These values are based on desired tolerances of ±0.003 inch, for example, although other tolerance values are also contemplated by the present invention as will be appreciated by those skilled in the art.

The second cylindrical cutting blade 56 may preferably have an inner diameter $ID_2$ in a range of about 0.845 to 0.905 inches, and, more preferably, in a range of about 0.878 to 0.884 inches. The second cylindrical cutting blade 56 may also have an outer diameter $OD_2$ less than about 0.970 inches. For example, the outer diameter $OD_2$ may range from about 0.963 to 0.970 inches. Accordingly, the wall thickness $T_2$ of the second cutting blade 56 may be in a range of about 0.040 to 0.046 inches.

The peel clearance PC may be in a range of about 0.078 to 0.110 inches for most oranges, for example. Of course, other values of peel clearance may also be used as will be appreciated by those skilled in the art.

The spacing of adjacent finger portions of the second cup from the second cutter may be in the conventional range of about 0.196 to 0.202 inches, for example. In addition, the prefinisher tube 64 and orifice tube 66 as described above may also be sized appropriately for the second cutter 56 having the inner and outer diameters as noted as will be readily appreciated by those skilled in the art without requiring further discussion.

Other aspects relating to the extractor 20 and associated methods are disclosed in copending application entitled "JUICE EXTRACTOR WITH ENHANCED QUALITY AND YIELD PERFORMANCE AND METHODS OF MAKING SAME" filed concurrently herewith on Oct. 15, 2002 Ser. No. 10/271,249. Accordingly, many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that other modifications and embodiments are intended to be included within the scope of the appended claims.

That which is claimed is:

1. A juice extractor comprising:
   a first cup comprising a first plurality of fingers extending outwardly and defining a first cup bore;
   a second cup comprising a second plurality of fingers extending outwardly and defining a second cup bore;
   said first and second cups being relatively movable along a reciprocal path of travel to compress fruit therebetween during juice extraction;
   a first cylindrical cutting blade within the first cup bore and in spaced relation from adjacent portions of said first plurality of fingers to define a peel clearance for ejecting portions of a fruit peal therethrough; and
   a second cylindrical cutting blade within the second cup bore and being received within said first cylindrical cutting blade during juice extraction;
   said first cylindrical cutting blade having an inner diameter in a range of about 0.990 to 1.010 inches, and a wall thickness in a range of about 0.068 to 0.088 inches;
   said second cylindrical cutting blade having an outer diameter to be received within the inner diameter of said first cylindrical cutting blade.

2. A juice extractor according to claim 1 wherein the inner diameter of said first cylindrical cutting blade is in a range of about 0.997 to 1.003 inches.

3. A juice extractor according to claim 1 wherein the wall thickness of said first cylindrical cutting blade is in a range of about 0.075 to 0.081 inches.

4. A juice extractor according to claim 1 wherein said second cylindrical cutting blade has an inner diameter in a range of about 0.845 to 0.905 inches.

5. A juice extractor according to claim 1 wherein said second cylindrical cutting blade has an inner diameter in a range of about 0.878 to 0.884 inches.

6. A juice extractor according to claim 1 wherein the peel clearance is in a range of about 0.078 to 0.110 inches.

7. A juice extractor according to claim 1 wherein said second cylindrical cutting blade has an outer diameter less than about 0.970 inches.

8. A juice extractor according to claim 1 further comprising a core positioned within said first cylindrical cutting blade.

9. A juice extractor according to claim 1 wherein said first cylindrical cutting blade has a beveled cutting edge; and wherein said second cylindrical cutting blade has a beveled cutting edge.

10. A juice extractor according to claim 1 wherein said second cup further comprises a ring base connected to the second plurality of fingers and defining the second cup bore; and further comprising a flange mounting said second cylindrical cutting blade to said ring base at a level flush with or above adjacent portions of said ring base.

11. A juice extractor according to claim 1 further comprising a first cutter base connected to said first cylindrical cutting blade; and wherein said first cutter base has at least one base opening therein.

12. A juice extractor according to claim 1 wherein the reciprocal path of travel comprises a substantially linear reciprocal path of travel.

13. A juice extractor comprising:
   a first cup comprising a first plurality of fingers extending outwardly and defining a first cup bore;
   a second cup comprising a second plurality of fingers extending outwardly and defining a second cup bore;
   said first and second cups being relatively movable along a reciprocal path of travel to compress fruit therebetween during juice extraction;
   a first cylindrical cutting blade within the first cup bore and in spaced relation from adjacent portions of said first plurality of fingers to define a peel clearance for ejecting portions of a fruit peal therethrough; and
   a second cylindrical cutting blade within the second cup bore and being received within said first cylindrical cutting blade during juice extraction;
   said first cylindrical cutting blade having an inner diameter in a range of about 0.997 to 1.003 inches, and a wall thickness in a range of about 0.075 to 0.081 inches;
   said second cylindrical cutting blade having an inner diameter in a range of about 0.878 to 0.884 inches and an outer diameter to be received within the inner diameter of said first cylindrical cutting blade.

14. A juice extractor according to claim 13 wherein the peel clearance is in a range of about 0.078 to 0.110 inches.

15. A juice extractor according to claim 13 wherein said second cylindrical cutting blade has an outer diameter less than about 0.970 inches.

16. A juice extractor according to claim 13 further comprising a core positioned within said first cylindrical cutting blade.

17. A juice extractor according to claim 13 wherein said first cylindrical cutting blade has a beveled cutting edge; and wherein said second cylindrical cutting blade has a beveled cutting edge.

18. A juice extractor according to claim 13 wherein said second cup further comprises a ring base connected to the second plurality of fingers and defining the second cup bore, and further comprising a flange mounting said second cylindrical cutting blade to said ring base at a level flush with or above adjacent portions of said ring base.

19. A juice extractor according to claim 13 further comprising a first cutter base connected to said first cylindrical cutting blade; and wherein said first cutter base has at least one base opening therein.

20. A juice extractor according to claim 13 wherein the reciprocal path of travel comprises a substantially linear reciprocal path of travel.

21. A cutter for use with a juice extractor including first and second cups relatively moveable for compressing fruit therebetween during juice extraction, the cutter comprising:
   a base; and
   a cylindrical cutting blade extending outwardly from said base and having an inner diameter in a range of about 0.990 to 1.010 inches, and a wall thickness in a range of about 0.068 to 0.088 inches.

22. A cutter according to claim 21 wherein the inner diameter of said cylindrical cutting blade is in a range of about 0.997 to 1.003 inches.

23. A cutter according to claim 21 wherein the wall thickness of said cylindrical cutting blade is in a range of about 0.075 to 0.081 inches.

24. A cutter according to claim 21 further comprising a core positioned within said cylindrical cutting blade.

25. A cutter according to claim 21 wherein said first cylindrical cutting blade has a beveled cutting edge.

26. A cutter according to claim 21 wherein said cutter base has at least one base opening therein.

27. A method for making a cutter for use with a juice extractor including first and second cups being relatively moveable for compressing fruit therebetween, the method comprising:
   providing a base; and
   forming a cylindrical cutting blade extending outwardly from said base and having an inner diameter in a range of about 0.990 to 1.010 inches, and a wall thickness in a range of about 0.068 to 0.088 inches.

28. A method according to claim 27 wherein the inner diameter of said cylindrical cutting blade is in a range of about 0.997 to 1.003 inches.

29. A method according to claim 27 wherein the wall thickness of said cylindrical cutting blade is in a range of about 0.075 to 0.081 inches.

30. A method according to claim 27 further comprising position a core within said cylindrical cutting blade.

31. A method according to claim 27 further comprising forming a beveled cutting edge for the cylindrical cutting blade.

* * * * *